(12) United States Patent
Minoo et al.

(10) Patent No.: US 9,872,034 B2
(45) Date of Patent: Jan. 16, 2018

(54) DEVICES AND METHODS FOR SIGNALING SAMPLE ADAPTIVE OFFSET (SAO) PARAMETERS

(71) Applicant: GOOGLE TECHNOLOGY HOLDINGS LLC, Mountain View, CA (US)

(72) Inventors: Koohyar Minoo, San Diego, CA (US); David Baylon, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 15/401,429

(22) Filed: Jan. 9, 2017

(65) Prior Publication Data
US 2017/0118478 A1    Apr. 27, 2017

Related U.S. Application Data

(63) Continuation of application No. 13/858,597, filed on Apr. 8, 2013, now Pat. No. 9,549,176.

(60) Provisional application No. 61/621,159, filed on Apr. 6, 2012.

(51) Int. Cl.
*H04N 19/196*    (2014.01)
*H04N 19/117*    (2014.01)
*H04N 19/13*    (2014.01)
*H04N 19/176*    (2014.01)
*H04N 19/186*    (2014.01)

(52) U.S. Cl.
CPC ......... *H04N 19/196* (2014.11); *H04N 19/117* (2014.11); *H04N 19/13* (2014.11); *H04N 19/176* (2014.11); *H04N 19/186* (2014.11)

(58) Field of Classification Search
CPC .... H04N 19/117; H04N 19/13; H04N 19/176; H04N 19/186; H04N 19/196
See application file for complete search history.

(56) References Cited

U.S. PATENT DOCUMENTS

2012/0082232 A1*  4/2012  Sole Rojals ......... H04N 19/176
                                                            375/240.18
2012/0294353 A1*  11/2012  Fu ......................... H04N 19/70
                                                            375/240.02

* cited by examiner

*Primary Examiner* — Md Haque
(74) *Attorney, Agent, or Firm* — Young Basile Hanlon & MacFarlane, P.C.

(57) ABSTRACT

Systems and methods that improve video quality by signaling of parameters in a sample adaptive offset (SAO) process are disclosed. The methods and systems described herein generally pertain to video processing such as video encoders and decoders.

20 Claims, 10 Drawing Sheets

US 9,872,034 B2

DEVICES AND METHODS FOR SIGNALING SAMPLE ADAPTIVE OFFSET (SAO) PARAMETERS

CROSS-REFERENCE TO RELATED APPLICATION(S)

The present disclosure is a continuation of U.S. patent application Ser. No. 13/858,597, filed Apr. 8, 2013, which is incorporated by reference herein in its entirety.

FIELD

The present disclosure relates generally to the field of video coding, and more specifically to systems, devices and methods for signaling sample adaptive offset (SAO) parameters.

BACKGROUND

Video compression uses block processing for many operations. In block processing, a block of neighboring pixels is grouped into a coding unit and compression operations treat this group of pixels as one unit to take advantage of correlations among neighboring pixels within the coding unit. Block-based processing often includes prediction coding and transform coding. Transform coding with quantization is a type of data compression which is commonly "lossy" as the quantization of a transform block taken from a source picture often discards data associated with the transform block in the source picture, thereby lowering its bandwidth requirement but often also resulting in quality loss in reproducing of the original transform block from the source picture.

MPEG-4 AVC, also known as H.264, is an established video compression standard that uses transform coding in block processing. In H.264, a picture is divided into macroblocks (MBs) of 16×16 pixels. Each MB is often further divided into smaller blocks. Blocks equal in size to or smaller than a MB are predicted using intra-/inter-picture prediction, and a spatial transform along with quantization is applied to the prediction residuals. The quantized transform coefficients of the residuals are commonly encoded using entropy coding methods (e.g., variable length coding or arithmetic coding). Context Adaptive Binary Arithmetic Coding (CABAC) was introduced in H.264 to provide a substantially lossless compression efficiency by combining an adaptive binary arithmetic coding technique with a set of context models. Context model selection plays a role in CABAC in providing a degree of adaptation and redundancy reduction. H.264 specifies two kinds of scan patterns over 2D blocks. A zigzag scan is used for pictures coded with progressive video compression techniques and an alternative scan is for pictures coded with interlaced video compression techniques.

HEVC (High Efficiency Video Coding), an international video coding standard developed to succeed H.264, extends transform block sizes to 16×16 and 32×32 pixels to benefit high definition (HD) video coding.

BRIEF SUMMARY

Accordingly, there is provided herein systems and methods that improve video quality by signaling of parameters in an SAO process. The methods and systems described herein generally pertain to video processing such as video encoders and decoders.

In one aspect, a method for determining sample adaptive offset parameters for blocks of a frame of a video sequence is disclosed. The method comprises determining whether to infer sample adaptive offset parameters for a first color component of a current block of the frame based on sample adaptive offset parameters of a left neighboring block of the current block. The method further comprises, responsive to determining to infer the sample adaptive offset parameters for the first color component based on the sample adaptive offset parameters of the left neighboring block, using sample adaptive offset parameters of a corresponding color component of the left neighboring block as the sample adaptive offset parameters for the first color component. The method further comprises, responsive to determining not to infer the sample adaptive offset parameters for the first color component based on the sample adaptive offset parameters of the left neighboring block, determining whether to infer the sample adaptive offset parameters for the first color component based on sample adaptive offset parameters of an above neighboring block of the current block. The method further comprises, responsive to determining to infer the sample adaptive offset parameters for the first color component based on the sample adaptive offset parameters of the above neighboring block, using sample adaptive offset parameters of a corresponding color component of the above neighboring block as the sample adaptive offset parameters for the first color component. The method further comprises, responsive to determining not to infer the sample adaptive offset parameters for the first color component based on the sample adaptive offset parameters of the above neighboring block, explicitly signaling the sample adaptive offset parameters for the first color component of the current block.

In another aspect, an apparatus for determining sample adaptive offset parameters for blocks of a frame of a video sequence is disclosed. The apparatus comprises a processor configured to execute instructions stored in a non-transitory storage medium to determine whether to infer sample adaptive offset parameters for a first color component of a current block of the frame based on sample adaptive offset parameters of a left neighboring block of the current block. The processor is further configured to execute instructions stored in the non-transitory storage medium to, responsive to a determination to infer the sample adaptive offset parameters for the first color component based on the sample adaptive offset parameters of the left neighboring block, use sample adaptive offset parameters of a corresponding color component of the left neighboring block as the sample adaptive offset parameters for the first color component. The processor is further configured to execute instructions stored in the non-transitory storage medium to, responsive to a determination not to infer the sample adaptive offset parameters for the first color component based on the sample adaptive offset parameters of the left neighboring block, determine whether to infer the sample adaptive offset parameters for the first color component based on sample adaptive offset parameters of an above neighboring block of the current block. The processor is further configured to execute instructions stored in the non-transitory storage medium to, responsive to a determination to infer the sample adaptive offset parameters for the first color component based on the sample adaptive offset parameters of the above neighboring block, use sample adaptive offset parameters of a corresponding color component of the above neighboring block as the sample adaptive offset parameters for the first color component. The processor is further configured to execute instructions stored in the non-transitory storage medium to, responsive to a determination not to infer the sample adaptive offset parameters for the first color component based on the sample adaptive offset parameters of the above neighboring block, explicitly signal the sample adaptive offset parameters for the first color component of the current block.

In another aspect, method for sample adaptive offset filtering is disclosed. The method comprises applying sample adaptive offset filtering to a frame including a current block according to an edge offset or a band offset for a first color component of the current block responsive to determining that a neighbor block of the current block usable for merge mode is available, wherein parameters for the edge offset or the band offset are inferred from the neighbor block.

BRIEF DESCRIPTION OF THE SEVERAL VIEWS OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

DETAILED DESCRIPTION

In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of video data consistent with this disclosure.

The present discussion begins with a very brief overview of some terms and techniques known in the art of digital image compression. This overview is not meant to teach the known art in any detail. Those skilled in the art know how to find greater details in textbooks and in the relevant standards.

An example of a video system in which an embodiment of the disclosure may be used will now be described. It is understood that elements depicted as function blocks in the figures may be implemented as hardware, software, or a combination thereof. Furthermore, embodiments of the disclosure may also be employed on other systems, such as on a personal computer, smartphone or tablet computer.

Figure 1A:
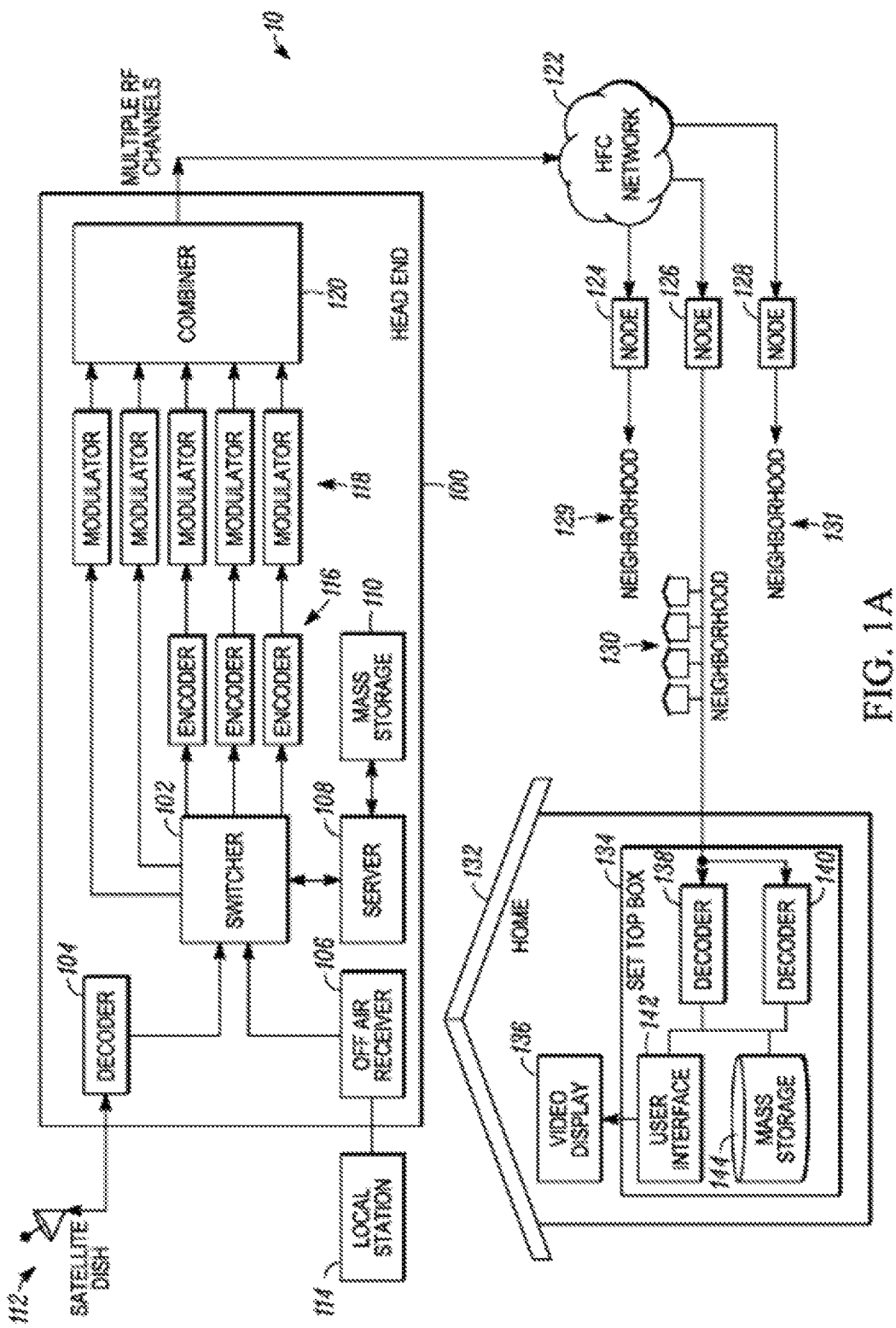
FIG. 1A is a video system in which the various embodiments of the disclosure may be used'

Referring to FIG. 1A, a video system, generally labeled 10, may include a head end 100 of a cable television network. The head end 100 may be configured to deliver video content to neighborhoods 129, 130 and 131. The head end 100 may operate within a hierarchy of head ends, with the head ends higher in the hierarchy generally having greater functionality. The head end 100 may be communicatively linked to a satellite dish 112 and receive video signals for non-local programming from it. The head end 100 may also be communicatively linked to a local station 114 that delivers local programming to the head end 100. The head end 100 may include a decoder 104 that decodes the video signals received from the satellite dish 112, an off-air receiver 106 that receives the local programming from the local station 114, a switcher 102 that routes data traffic among the various components of the head end 100, encoders 116 that encode video signals for delivery to customers, modulators 118 that modulate signals for delivery to customers, and a combiner 120 that combines the various signals into a single, multi-channel transmission.

The head end 100 may also be communicatively linked to a hybrid fiber cable (HFC) network 122. The HFC network 122 may be communicatively linked to a plurality of nodes 124, 126, and 128. Each of the nodes 124, 126, and 128 may be linked by coaxial cable to one of the neighborhoods 129, 130 and 131 and deliver cable television signals to that neighborhood. One of the neighborhoods 130 of FIG. 1A is shown in more detail. The neighborhood 130 may include a number of residences, including a home 132 shown in FIG. 1A. Within the home 132 may be a set-top box 134 communicatively linked to a video display 136. The set-top box 134 may include a first decoder 138 and a second decoder 140. The first and second decoders 138 and 140 may be communicatively linked to a user interface 142 and a mass storage device 144. The user interface 142 may be communicatively linked to the video display 136.

During operation, head end 100 may receive local and nonlocal programming video signals from the satellite dish 112 and the local station 114. The nonlocal programming video signals may be received in the form of a digital video stream, while the local programming video signals may be received as an analog video stream. In some embodiments, local programming may also be received as a digital video stream. The digital video stream may be decoded by the decoder 104 and sent to the switcher 102 in response to customer requests. The head end 100 may also include a server 108 communicatively linked to a mass storage device 110. The mass storage device 110 may store various types of video content, including video on demand (VOD), which the server 108 may retrieve and provide to the switcher 102. The switcher 102 may route local programming directly to the modulators 118, which modulate the local programming, and route the non-local programming (including any VOD) to the encoders 116. The encoders 116 may digitally encode the non-local programming. The encoded non-local programming may then be transmitted to the modulators 118. The combiner 120 may be configured to receive the modulated analog video data and the modulated digital video data, combine the video data and transmit it via multiple radio frequency (RF) channels to the HFC network 122.

The HFC network 122 may transmit the combined video data to the nodes 124, 126 and 128, which may retransmit the data to their respective neighborhoods 129, 130 and 131. The home 132 may receive this video data at the set-top box 134, more specifically at the first decoder 138 and the second decoder 140. The first and second decoders 138 and 140 may decode the digital portion of the video data and provide the decoded data to the user interface 142, which then may provide the decoded data to the video display 136.

The encoders 116 and the decoders 138 and 140 of FIG. 1A (as well as all of the other steps and functions described herein) may be implemented as computer code comprising computer readable instructions stored on a computer readable storage device, such as memory or another type of storage device. The computer code may be executed on a computer system by a processor, such as an application-specific integrated circuit (ASIC), or other type of circuit. For example, computer code for implementing the encoders 116 may be executed on a computer system (such as a server) residing in the headend 100. Computer code for the decoders 138 and 140, on the other hand, may be executed on the set-top box 134, which constitutes a type of computer system. The code may exist as software programs comprised of program instructions in source code, object code, executable code or other formats. It should be appreciated that the computer code for the various components shown in FIG. 1A may reside anywhere in system 10 or elsewhere (such as in a cloud network), that is determined to be desirable or advantageous. Furthermore, the computer code may be located in one or more components, provided the instructions may be effectively performed by the one or more components.

Figure 1B:
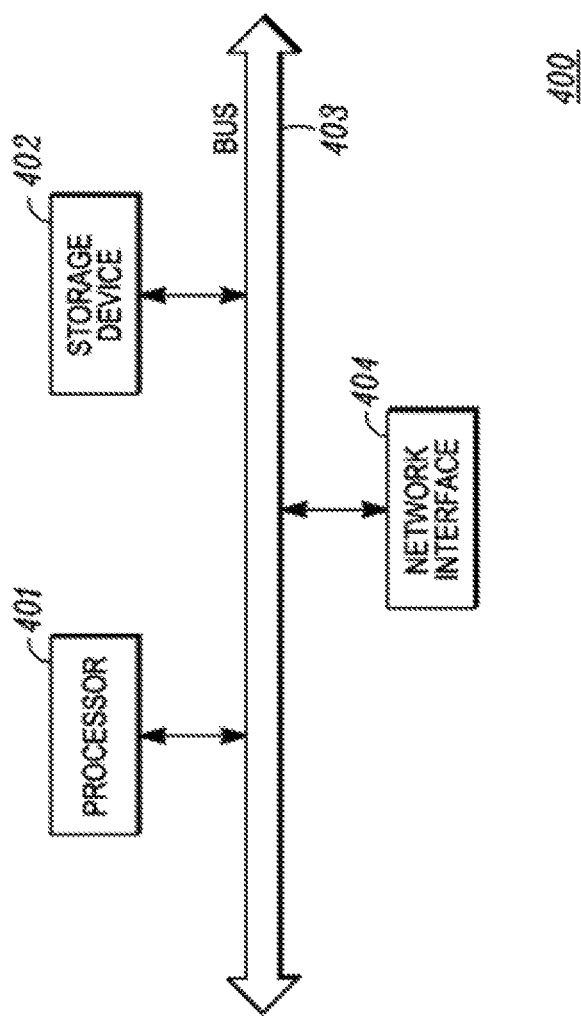
FIG. 1B is a computer system on which embodiments of the disclosure may be implemented.

FIG. 1B shows an example of a computer system on which computer code for the encoders 116 and the decoders 138 and 140 may be executed. The computer system, generally labeled 400, includes a processor 401, or processing circuitry, that may implement or execute software instructions performing some or all of the methods, functions and other steps described herein. Commands and data from processor 401 may be communicated over a communication bus 403, for example. Computer system 400 may also include a computer readable storage device 402, such as random access memory (RAM), where the software and data for processor 401 may reside during runtime. Storage device 402 may also include non-volatile data storage. Computer system 400 may include a network interface 404 for connecting to a network. Other known electronic components may be added or substituted for the components depicted in the computer system 400. The computer system 400 may reside in the headend 100 and execute the encoders 116, and may also be embodied in the set-top box 134 to execute the decoders 138 and 140. Additionally, the computer system 400 may reside in places other than the headend 100 and the set-top box 134, and may be miniaturized so as to be integrated into a smartphone or tablet computer.

Video encoding systems achieve compression by removing redundancy in the video data, e.g., by removing those elements that can be discarded without adversely affecting reproduction fidelity. Because video signals take place in time and space, most video encoding systems exploit both temporal and spatial redundancy present in these signals. Typically, there is high temporal correlation between successive frames. This is also true in the spatial domain for pixels which are close to each other. Thus, high compression gains are achieved by carefully exploiting these spatio-temporal correlations.

Figure 2A:
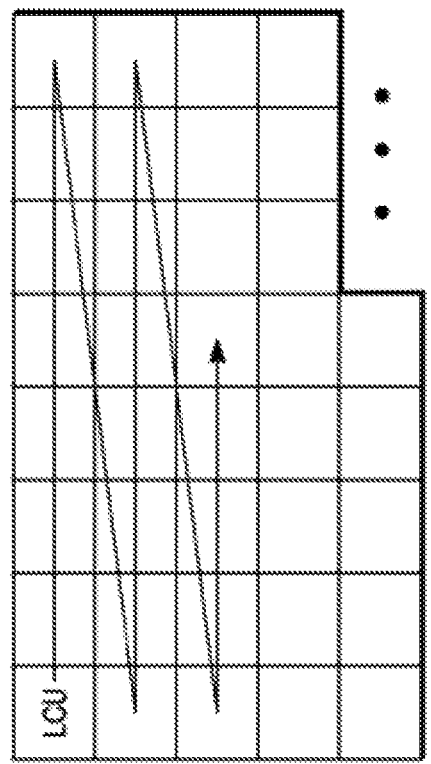
FIGS. 2A, 2B, 3A and 3B illustrate certain video encoding principles according to embodiments of the disclosure.
Figures 3A, 3B:
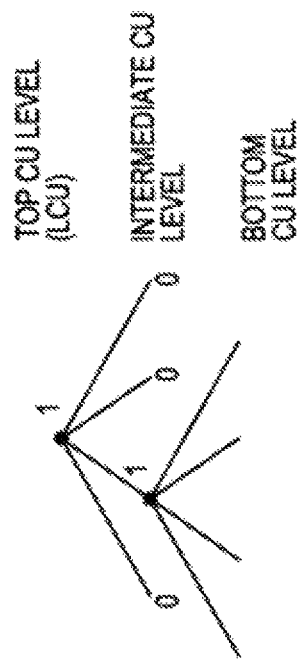

A high-level description of how video data gets encoded and decoded by the encoders 116 and the decoders 138 and 140 in an embodiment of the disclosure will now be provided. In this embodiment, the encoders and decoders operate according to a High Efficiency Video Coding (HEVC) method. HEVC is a block-based hybrid spatial and temporal predictive coding method. In HEVC, an input picture is first divided into square blocks, called LCUs (largest coding units) or CTUs (coding tree units), as shown in FIG. 2A. Unlike other video coding standards, in which the basic coding unit is a macroblock of 16×16 pixels, in HEVC, the LCU can be as large as 128×128 pixels. An LCU can be divided into four square blocks, called CUs (coding units), which are a quarter of the size of the LCU. Each CU can be further split into four smaller CUs, which are a quarter of the size of the original CU. The splitting process can be repeated until certain criteria are met. FIG. 3A shows an example of LCU partitioned into CUs.

How a particular LCU is split into CUs can be represented by a quadtree. At each node of the quadtree, a flag is set to "1" if the node is further split into sub-nodes. Otherwise, the flag is unset at "0." For example, the LCU partition of FIG. 3A can be represented by the quadtree of FIG. 3B. These "split flags" may be jointly coded with other flags in the video bitstream, including a skip mode flag, a merge mode flag, and a predictive unit (PU) mode flag, and the like. In the case of the quadtree of FIG. 3B, the split flags 10100 could be coded as overhead along with the other flags. Syntax information for a given CU may be defined recursively, and may depend on whether the CU is split into sub-CUs.

Figure 2B:
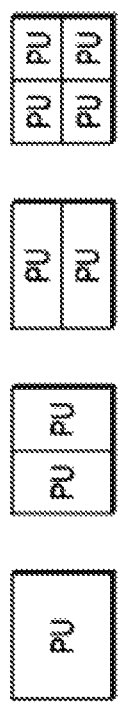

A CU that is not split (e.g., a CU corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. Thus, at each leaf of a quadtree, a final CU of 2N×2N can possess one of four possible patterns (N×N, N×2N, 2N×N and 2N×2N), as shown in FIG. 2B. While shown for 2N×2N CU, other PUs having different dimensions and corresponding patterns (e.g., square or rectangular) may be used. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s). The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

In general, in intra-prediction encoding, a high level of spatial correlation is present between neighboring blocks in a frame. Consequently, a block can be predicted from the nearby encoded and reconstructed blocks, giving rise to the intra prediction. In some embodiments, the prediction can be formed by a weighted average of the previously encoded samples, located above and to the left of the current block. The encoder may select the mode that minimizes the difference or cost between the original and the prediction and signals this selection in the control data.

In general, in inter-prediction encoding, video sequences have high temporal correlation between frames, enabling a block in the current frame to be accurately described by a region in the previous coded frames, which are known as reference frames. Inter-prediction utilizes previously encoded and reconstructed reference frames to develop a prediction using a block-based motion estimation and compensation technique.

Following intra-predictive or inter-predictive encoding to produce predictive data and residual data, and following any transforms (such as the 4×4 or 8×8 integer transform used in H.264/AVC or a discrete cosine transform (DCT)) to produce transform coefficients, quantization of transform coefficients may be performed. Quantization generally refers to a process in which transform coefficients are quantized to possibly reduce the amount of data used to represent the coefficients, e.g., by converting high precision transform coefficients into a finite number of possible values. These steps will be discussed in more detail below.

Figures 5A, 5B:
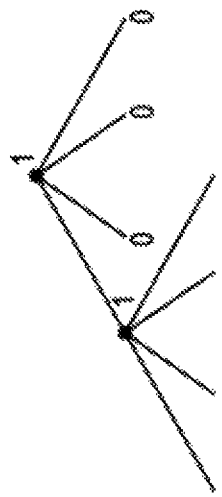
FIGS. 5A and 5B illustrate further video coding principles according to embodiments of the disclosure.

Each CU can also be divided into transform units (TUs) by application of a block transform operation. A block transform operation tends to decorrelate the pixels within the block and compact the block energy into the low order coefficients of the transform block. In some embodiments, one transform of 8×8 or 4×4 may be applied. In other embodiments, a set of block transforms of different sizes may be applied to a CU, as shown in FIG. 5A where the left block is a CU partitioned into PUs and the right block is the associated set of transform units (TUs). The size and location of each block transform within a CU is described by a separate quadtree, called RQT. FIG. 5B shows the quadtree representation of TUs for the CU in the example of FIG. 5A. In this example, 11000 is coded and transmitted as part of the overhead.

The TUs and PUs of any given CU may be used for different purposes. TUs are typically used for transformation, quantizing and coding operations, while PUs are typically used for spatial and temporal prediction. There is not necessarily a direct relationship between the number of PUs and the number of TUs for a given CU.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized. In video encoding, quantization is the step that introduces loss, so that a balance between bitrate and reconstruction quality can be established. These steps will be discussed further below.

Block partitioning serves an important purpose in block-based video coding techniques. Using smaller blocks to code video data may result in better prediction of the data for locations of a video frame that include high levels of detail, and may therefore reduce the resulting error (e.g., deviation of the prediction data from source video data), represented as residual data. In general, prediction exploits the spatial or temporal redundancy in a video sequence by modeling the correlation between sample blocks of various dimensions, such that only a small difference between the actual and the predicted signal needs to be encoded. A prediction for the current block is created from the samples which have already been encoded. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (e.g., sub-blocks) may be considered video blocks. In addition, a slice may be considered to be a plurality of video blocks (e.g., macroblocks, or coding units), and/or sub-blocks (partitions of macroblocks, or sub-coding units). Each slice may be an independently decodable unit of a video frame. Alternatively, frames themselves may be decodable units, or other portions of a frame may be defined as decodable units. Furthermore, a GOP, also referred to as a group of pictures, may be defined as a decodable unit.

Figure 4A:
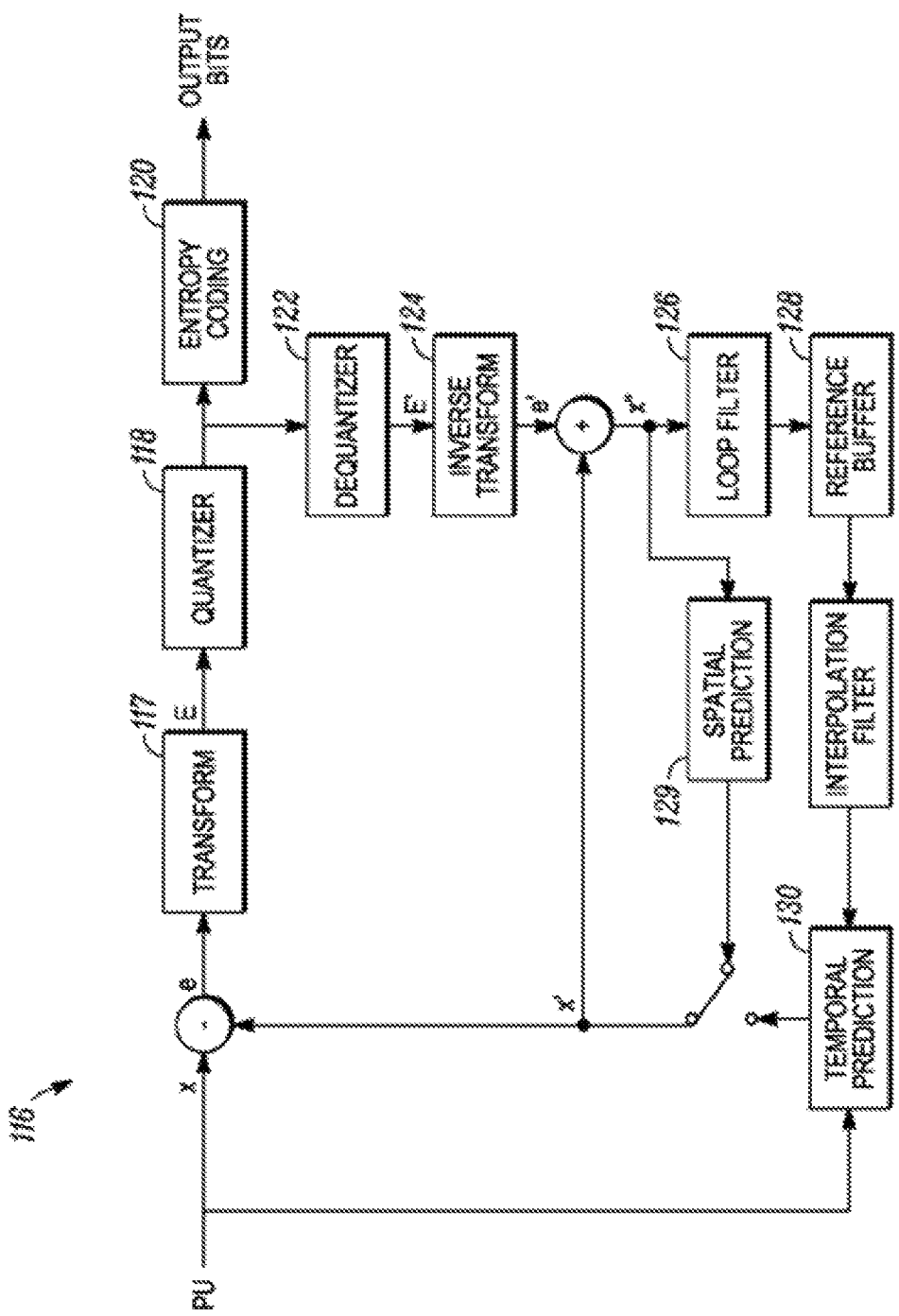
FIGS. 4A and 4B show possible architectures for an encoder and a decoder according to embodiments of the disclosure.

The encoders 116 (FIG. 1A) may be, according to an embodiment of the disclosure, composed of several functional modules as shown in FIG. 4A. These modules may be implemented as hardware, software, or any combination of the two. Given a current PU, x, a prediction PU, x', may first be obtained through either spatial prediction or temporal prediction. This spatial or temporal prediction may be performed by a spatial prediction module 129 or a temporal prediction module 130 respectively.

There are several possible spatial prediction directions that the spatial prediction module 129 can perform per PU, including horizontal, vertical, 45-degree diagonal, 135-degree diagonal, DC, Planar, etc. Including the Luma intra modes, an additional mode, called IntraFromLuma, may be used for the Chroma intra prediction mode. A syntax indicates the spatial prediction direction per PU.

The encoder 116 (FIG. 1A) may perform temporal prediction through motion estimation operation. Specifically, the temporal prediction module 130 (FIG. 4A) may search for a best match prediction for the current PU over reference pictures. The best match prediction may be described by motion vector (MV) and associated reference picture (refIdx). Generally, a PU in B pictures can have up to two MVs. Both MV and refIdx may be part of the syntax in the bitstream.

The prediction PU may then be subtracted from the current PU, resulting in the residual PU, e. The residual PU, e, may then be transformed by a transform module 117, one transform unit (TU) at a time, resulting in the residual PU in the transform domain, E. To accomplish this task, the transform module 117 may use e.g., either a square or a non-square block transform.

Referring back to FIG. 4A, the transform coefficients E, may then be quantized by a quantizer module 118, converting the high precision transform coefficients into a finite number of possible values. The quantization process may reduce the bit depth associated with some or all of the coefficients. For example, an n-bit value may be rounded down to an m-bit value during quantization, where n is greater than m. In some embodiments, external boundary conditions are used to produce modified one or more transform coefficients. For example, a lower range or value may be used in determining if a transform coefficient is given a nonzero value or just zeroed out. As should be appreciated, quantization is a lossy operation and the loss by quantization generally cannot be recovered.

The quantized coefficients may then be entropy coded by an entropy coding module 120, resulting in the final compression bits. The specific steps performed by the entropy coding module 120 will be discussed below in more detail.

To facilitate temporal and spatial prediction, the encoder 116 may also take the quantized transform coefficients E and dequantize them with a dequantizer module 122 resulting in the dequantized transform coefficients E'. The dequantized transform coefficients are then inverse transformed by an inverse transform module 124, resulting in the reconstructed residual PU, e'. The reconstructed residual PU, e', is then added to the corresponding prediction, x', either spatial or temporal, to form a reconstructed PU, x".

Referring still to FIG. 4A, a deblocking filter (DBF) operation may be performed on the reconstructed PU, x", first to reduce blocking artifacts. A sample adaptive offset (SAO) process may be conditionally performed after the completion of the deblocking filter process for the decoded picture, which compensates the pixel value offset between reconstructed pixels and original pixels. In some embodiments, both the DBF operation and SAO process are implemented by adaptive loop filter functions, which may be performed conditionally by a loop filter module 126 over the reconstructed PU. In some embodiments, the adaptive loop filter functions minimize the coding distortion between the input and output pictures. In some embodiments, loop filter module 126 operates during an inter-picture prediction loop. If the reconstructed pictures are reference pictures, they may be stored in a reference buffer 128 for future temporal prediction.

HEVC specifies two loop filters that are applied in order with the de-blocking filter (DBF) applied first and the sample adaptive offset (SAO) filter applied afterwards. The DBF is similar to the one used by H.264/MPEG-4 AVC but with a simpler design and better support for parallel processing. In HEVC the DBF only applies to an 8×8 sample grid while with H.264/MPEG-4 AVC the DBF applies to 4×4 sample grid. DBF uses an 8×8 sample grid since it causes no noticeable degradation and significantly improves parallel processing because the DBF no longer causes cascading interactions with other operations. Another change is that HEVC only allows for three DBF strengths of 0 to 2. HEVC also requires that the DBF first apply horizontal filtering for vertical edges to the picture and only after that does it apply vertical filtering for horizontal edges to the picture. This allows for multiple parallel threads to be used for the DBF.

The SAO filter process is applied after the DBF and is made to allow for better reconstruction of the original signal amplitudes by using e.g., a look up table that includes some parameters that are based on a histogram analysis made by the encoder. The SAO filter has two basic types which are the edge offset (EO) type and the band offset (BO) type. One of the SAO types can be applied per coding tree block (CTB). The edge offset (EO) type has four sub-types corresponding to processing along four possible directions (e.g., horizontal, vertical, 135 degree, and 45 degree). For a given EO sub-type, the edge offset (EO) processing operates by comparing the value of a pixel to two of its neighbors using one of four different gradient patterns. An offset is applied to pixels in each of the four gradient patterns. For pixel values that are not in one of the gradient patterns, no offset is applied. The band offset (BO) processing is based directly on the sample amplitude which is split into 32 bands. An offset is applied to pixels in 16 of the 32 bands, where a group of 16 bands corresponds to a BO sub-type. The SAO filter process was designed to reduce distortion compared to the original signal by adding an offset to sample values. It can increase edge sharpness and reduce ringing and impulse artifacts. Further detail on the SAO process will be discussed below with reference to FIGS. 6-8.

In an embodiment of the disclosure, intra pictures (such as an I picture) and inter pictures (such as P pictures or B pictures) are supported by the encoder 116 (FIG. 1A). An intra picture may be coded without referring to other pictures. Hence, spatial prediction may be used for a CU/PU inside an intra picture. An intra picture provides a possible point where decoding can begin. On the other hand, an inter picture generally aims for high compression. Inter picture supports both intra and inter prediction. A CU/PU in inter picture is either spatially or temporally predictive coded. Temporal references are the previously coded intra or inter pictures.

The operation of the entropy coding module 120 (FIG. 4A) according to an embodiment will now be described in more detail. The entropy coding module 120 takes the quantized matrix of coefficients received from the quantizer module 118 and uses it to generate a sign matrix that represents the signs of all of the quantized coefficients and to generate a significance map. A significance map may be a matrix in which each element specifies the position(s) of the non-zero quantized coefficient(s) within the quantized coefficient matrix. Specifically, given a quantized 2D transformed matrix, if the value of a quantized coefficient at a position (y, x) is non-zero, it may be considered as significant and a "1" is assigned for the position (y, x) in the associated significance map. Otherwise, a "0" is assigned to the position (y, x) in the significance map.

Once the entropy coding module 120 has created the significance map, it may code the significance map. In one embodiment, this is accomplished by using a context-based adaptive binary arithmetic coding (CABAC) technique. In doing so, the entropy coding module 120 scans the significance map along a scanning line and, for each entry in the significance map, the coding module chooses a context model for that entry. The entropy coding module 120 then codes the entry based on the chosen context model. That is, each entry is assigned a probability based on the context model (the mathematical probability model) being used. The probabilities are accumulated until the entire significance map has been encoded.

The value output by the entropy coding module 120 as well as the entropy encoded signs, significance map and non-zero coefficients may be inserted into the bitstream by the encoder 116 (FIG. 1A). This bitstream may be sent to the decoders 138 and 140 over the HFC network 122.

It should be noted that the prediction, transform, and quantization described above may be performed for any block of video data, e.g., to a PU and/or TU of a CU, or to a macroblock, depending on the specified coding standard.

Figure 4B:
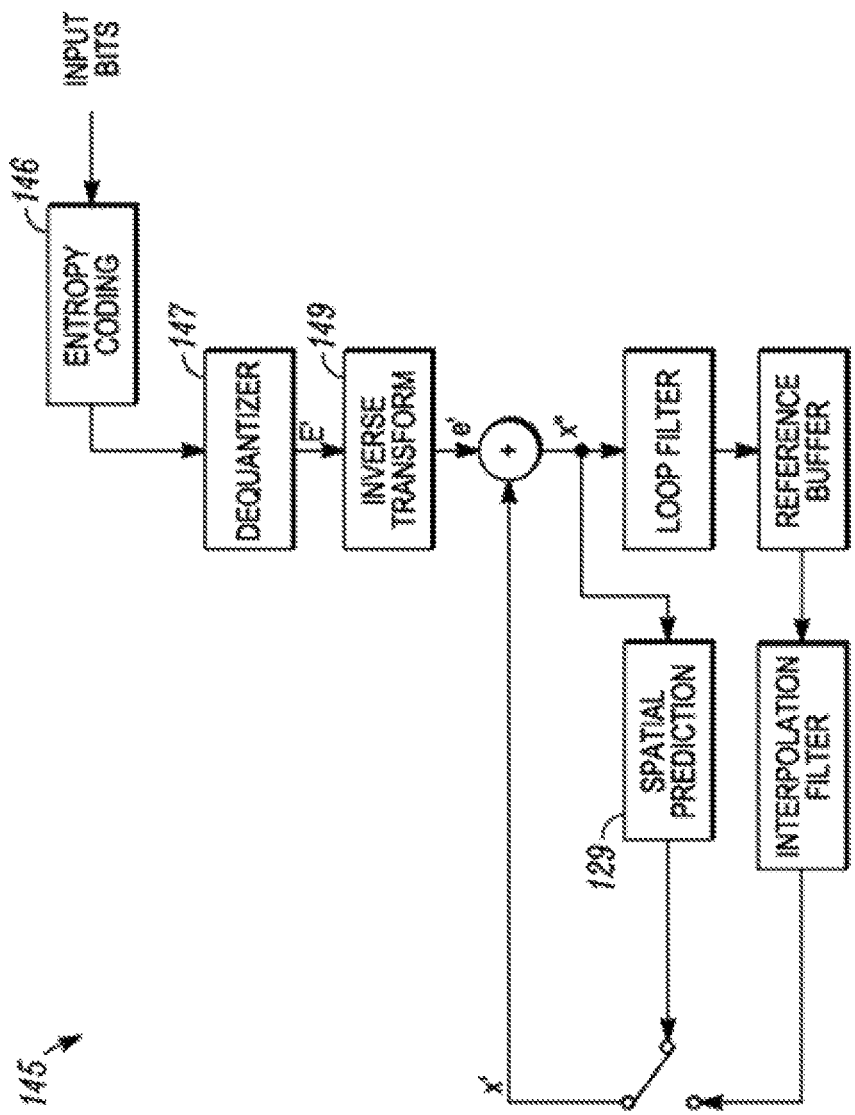

When the decoders 138 and 140 (FIG. 1A) receive the bitstream, they perform the functions shown in e.g., FIG. 4B. An entropy decoding module 146 of the decoder 145 may decode the sign values, significance map and non-zero coefficients to recreate the quantized and transformed coefficients. In decoding the significance map, the entropy decoding module 146 may perform the reverse of the procedure described in conjunction with the entropy coding module 120—decoding the significance map along a scanning pattern made up of scanning lines. The entropy decoding module 146 then may provide the coefficients to a dequantizer module 147, which dequantizes the matrix of coefficients, resulting in F. The dequantizer module 147 may provide the dequantized coefficients to an inverse transform module 149. The inverse transform module 149 may perform an inverse transform operation on the coefficients resulting in e'. Filtering and spatial prediction may be applied in a manner described in conjunction with FIG. 4A.

Sample Adaptive Offset (SAO)

In an SAO process, an offset is added to each pixel to reduce the distortion of the reconstructed pixel relative to the original pixel. In one embodiment, for a partition in a luma or chroma component, an encoder categorizes the pixels into one of six possible types (both types and sub-types are collectively referred to as types here): four edges offset (EO)

types E0, E1, E2, E3 and two band offset (BO) types B0, B1. For the EO types, the pixels are further sub-categorized into one of five possible sub-classes based upon local behavior along the EO type direction. These five sub-classes are described in further detail below. For the BO types, the pixels are further sub-categorized into one of sixteen possible sub-classes based upon intensity. In some embodiments, for a given sub-class of pixels within an SAO type, the same offset is applied. For example, if the offset for sub-class i is $o_i$, then the SAO output corresponding to an input of $p_i$ will be p, $+o_i$. The encoder typically selects the SAO type per sub-class to minimize a cost function. For example, if the distortion for a given type t and set of offsets $o_{t,i}$ is $D_{t,i}$ and the corresponding bitrate is $R_{t,i}$, then the cost function can be $J_{t,i}=D_{t,i}+lambda*R_{t,i}$, where lambda is a weighting factor. The encoder may signal to the decoder the SAO type per partition and the corresponding offsets per sub-class, and the decoder may perform the classification for the SAO type and applies the offsets per sub-class to each pixel. The SAO type can be signaled per color component, or a given type can be signaled and used for more than one color component. In some embodiments, it is also possible for the encoder to not use or turn off SAO, and this can also be signaled to the decoder.

As described above, there are four possible EO types or classes, and five possible sub-classes per type. As used here, EO type or class refers to the direction along where pixels will be processed, and sub-class refers to the categorization of pixel values according to the gradient pattern along the EO type or class direction. In some embodiments, the number of EO sub-classes may be extended to a total of nine sub-classes, where each pixel is classified depending on whether it is smaller, equal, or larger than the two neighboring pixels along the direction indicated by EO type or class.

In some embodiments, one or more of the EO modifications described herein can be combined to improve overall performance. It should be appreciated that the SAO (EO) sub-classes and offsets described herein can be signaled at a partition, LCU, slice, picture, group of pictures, or sequence level. The SAO (EO) sub-classes and offsets can also be combined with band offset types and offsets signaled at the partition, LCU, slice, picture, group of pictures, or sequence level.

Coding of SAO Type

For coding of SAO type, there are generally two coding methods: high efficiency (HE) and low complexity (LC). In LC, variable length codewords (VLCs) or binarized codewords are assigned to the SAO types; while in HE, the binarized codeword typically assigned to the type is followed by context-based adaptive binary arithmetic coding (CABAC). For the HE case, an encoder may signal the SAO type using a unary code, for example (0's and 1's can be interchanged) as shown in Table 1:

TABLE 1

| SAO Type | Code |
|---|---|
| Off | 0 |
| E0 | 10 |
| E1 | 110 |
| E2 | 1110 |
| E3 | 11110 |
| B0 | 111110 |
| B1 | 1111110 |

In Table 1, when SAO type is Off, no SAO is applied and the corresponding codeword is 0. The other codewords correspond to the other EO and BO types.

It may be noted that the units or digits within a codeword may be referred to as "bits" for LC and "bins" for HE. The difference in terminology is a result of applying CABAC to the codeword in the HE method. As used herein, "units" includes both bins and bits in codewords.

Modifications for SAO Parameter Coding Across Color Components

Figure 6:
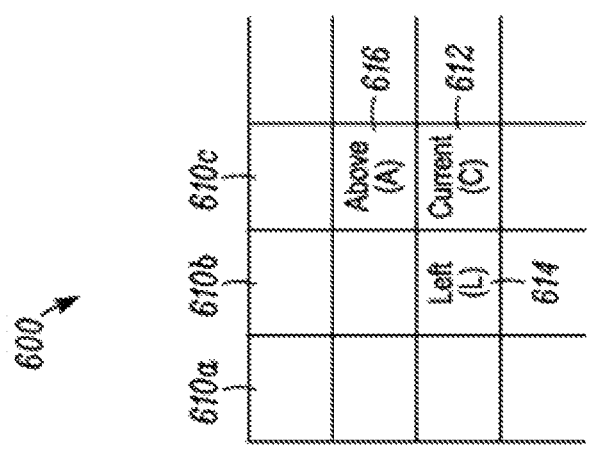
FIG. 6 illustrates an example LCU and its surrounding neighbors which may be used to obtain SAO parameters according to an embodiments of the disclosure.

In LCU-based SAO, SAO parameters for an LCU can be inferred from a left neighbor ("merge left"), an above neighbor ("merge up"), or explicitly signaled (no merge). FIG. 6 illustrates a partitioning of a picture or slice 600 in terms of LCU units 610. For the current (C) LCU 612, the left neighboring (L) LCU 614 and the above neighboring (A) LCU 616 is shown. In some cases, the left neighboring LCU 614 or the above neighboring LCU 616 may not be available, for example, if the current LCU 612 is along the left edge or top edge, respectively, of the picture or slice. When merge is used, the SAO parameters are copied from the neighboring LCU. In the case that merge is used and the neighboring LCU does not apply SAO, then the current LCU 612 does not apply SAO. In another example, when merge is used and the neighboring LCU has SAO on for only the luma component, then the current LCU also applies SAO to only the luma component using the same SAO parameters as the neighboring LCU. In some embodiments, an encoder determines which merge to use.

In the conventional methods, the merge decision is performed on a color component basis. For example, for the luma component, the encoder determines whether or not the SAO components for luma are copied from a left neighboring LCU (assuming the left neighbor exits). This luma merge left mode decision can be signaled from the encoder to the decoder. If merge left is not chosen for luma, merge up may be checked for luma (assuming the above neighbor exists). If merge up is not chosen for luma, then the SAO parameters may be explicitly signaled for luma. This is repeated for the chroma components.

In some embodiments, the SAO parameters include the SAO type. The SAO type may be one of three types: Skip, Edge or Band. If the SAO type is Skip, then SAO is not applied (e.g., SAO off). If the SAO type is Edge or Band, then Edge or Band offsets are applied (SAO on), respectively, as described in detail above. If the SAO type is Edge or Band, then the SAO parameters (e.g. EO type or class and SAO offsets) would be transmitted from encoder to decoder.

In some embodiments, SAO signaling may take advantage or utilize typical SAO LCU-statistics. For example, statistics may indicate that when merge left is selected for a given color component, it is likely selected for all the components. In other words, when an encoder chooses merge left for the luma component, it is very likely to choose merge left for the chroma components as well. Therefore, instead of signaling merge left for each component separately and independently, a merge left flag may be used or signaled to indicate whether all color components may be inferred from an SAO parameter from left (e.g., merge left). If so, all color components will use merge left mode.

Figure 7:
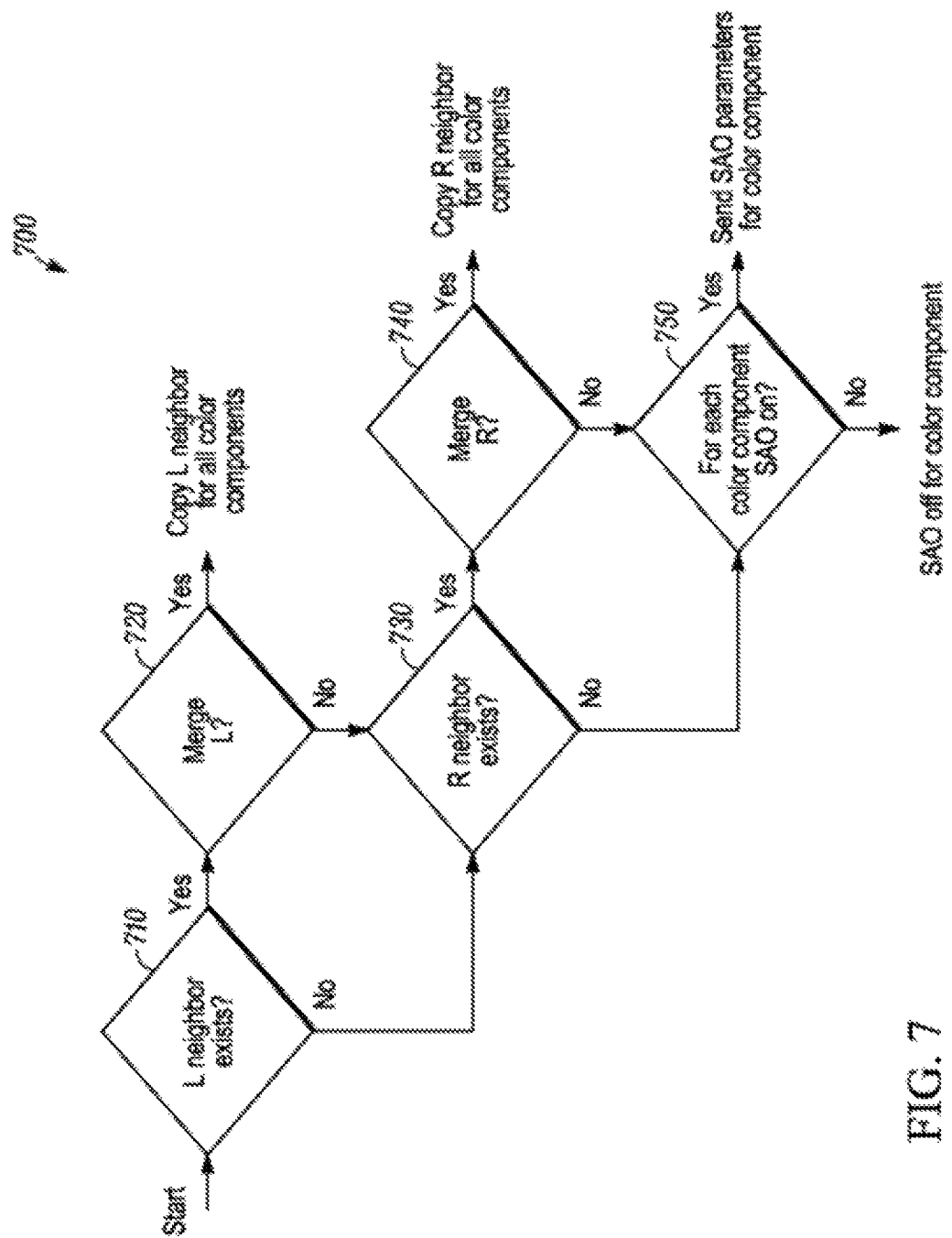
FIG. 7 illustrates an example of SAO merge across all color components according to embodiments of the disclosure.

FIG. 7 shows an example condition tree that illustrates a process 700 that determines when to use merge for a current LCU. For the current LCU, if the left neighbor exists at block 710, a syntax element can be signaled to indicate if all color components use merge left at block 720 (e.g., left neighbor SAO parameters for all color components). If merge left is signaled, then the decoder can copy the left neighbor SAO parameters for each respective color component for the current LCU. If the color components do not use merge left (or if the left neighbor does not exist), then the merge above mode can be checked for all color components at block 730 (e.g., according to process explained above for merge left). Similar to merge left, a merge above (or up) flag may be used or signaled to indicate whether all color components may be inferred from SAO parameters from the LCU above (e.g., merge up) at block 740. It is also possible to signal merge above for individual color components, although this is not shown in FIG. 7. If merge up mode is not chosen (or if the above neighbor LCU does not exist), then explicit SAO parameters can be signaled, for example, using different parameters for each color component at block 750. For example, in FIG. 7, for each color component, it can be signaled whether SAO is used (SAO on) or not (SAO off or skipped). If SAO is on for a color component, the SAO parameters for the component are signaled. Otherwise, if SAO is off for a color component and SAO is not applied to the component. This can be repeated for each luma and chroma component separately.

As an example, for individual color components, a total of three merge flags may be used: one merge flag may be signaled for a luma component and one merge flag may be signaled for each chroma component, for a total of two merge flags for chroma. By using a single merge flag to indicate how to obtain SAO parameters, up to two bits may be saved.

In some embodiments, two components are involved in the decision to use a single merge flag for all color components: an algorithmic component and a syntax component. For example, for the algorithmic component, if one color component merges, then all three color components merge. For the syntax component, when a flag is signaled, the flag applies to more than one color component (e.g., all three color components).

In some embodiments, merge left and/or merge up flags for different color components can be entropy coded jointly such that the overall bits are saved compared to entropy coding those flags (per color) independently, thereby improving the coding efficiency of SAO. For example, for the case of three color components, there are eight possible combinations of merge on/off for the three components. Codewords can be assigned to each of the eight possible combinations, where shorter codewords are assigned to the more probable combinations. In some embodiments, the shortest codewords can correspond to the case where all color components use merge left or merge above.

Parsing and Signaling of SAO Parameters

As explained above, a merge left flag or merge above (up) flag may be used to indicate whether all color components may be inferred from an SAO parameter from the left or above, respectively. The merge left or merge up flags can be explicitly signaled. However, in some cases the merge flag can be inferred. For example, if the left neighbor and above neighbor use identical SAO parameters, and if merge left is not selected for the current LCU, then merge above should also not be selected. In this case, the decoder can parse the merge left flag from the bitstream that indicates that merge left is not selected. The decoder can then check if the left neighbor and above neighbor use the same SAO parameters. If the left neighbor and above neighbor use the same SAO parameters, then the decoder can infer that the merge above flag indicates that merge above is not selected. In this case, the merge above flag is not sent in the bitstream and the decoder does not expect or parse a merge above flag but sets the merge above flag to not merge above (merge above is off). By conditionally signaling SAO parameters such as the merge above flag, bits can be saved.

In some embodiments, some of the above-described information may be conditionally parsed as follows:

Skip merge above (up) flag if the merge left flag is not set and both merge left and merge up would refer to LCUs with an SAO off condition (e.g., or more generally they both refer to LCU with identical SAO parameters).

Skip SAO on/off flags, if either of the merge left or merge above would point to an LCU with SAO off condition.

The conditional parsing may result in certain flags being skipped. In other words, the flags need not be transmitted in the bitstream and the decoder can infer the value of the flags from information it already has.

Figure 8:
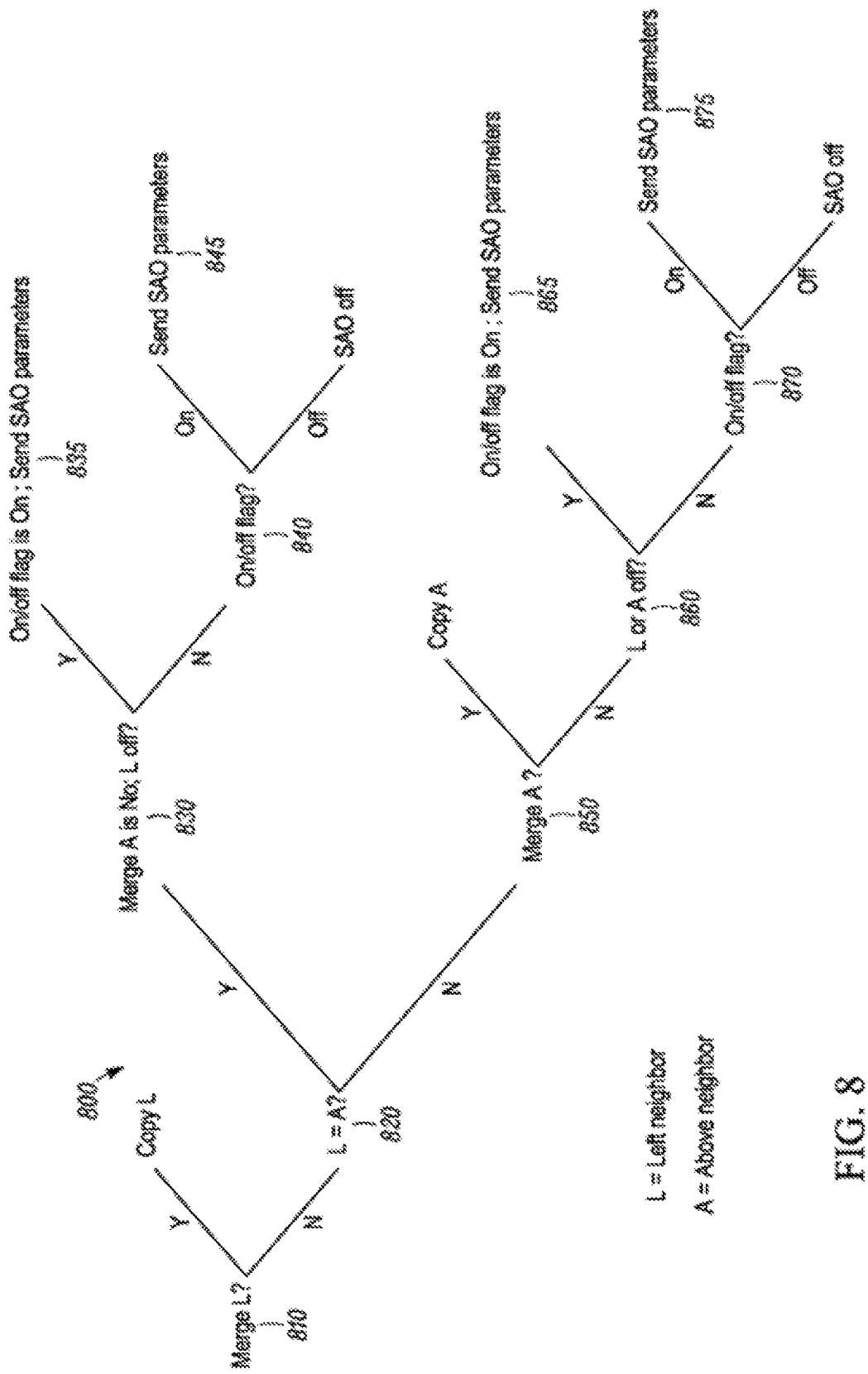
FIG. 8 illustrates an example of conditional parsing according to embodiments of this disclosure.

FIG. 8 shows an example condition tree that illustrates a process 800 that determines when to transmit SAO parameters. FIG. 8 shows the steps an encoder can take for determining when to transmit SAO parameters, although the corresponding decoder performs similar actions when parsing the bitstream data. The steps can correspond to individual color components or to the components jointly. For example, the merge flag can correspond to merge for all color components as described previously. FIG. 8 corresponds to an embodiment where merge left is first checked, followed by merge above, and then merge on/off. At block 810, an encoder may determine whether to merge left and may transmit the merge left flag to the decoder. If merge left is selected, then the SAO parameters from the left neighbor are copied. If merge left is not selected, at block 820, an encoder may determine if the left neighbor SAO conditions are the same as the above neighbor SAO conditions. Examples of when the neighbor SAO conditions are the same include: when both neighbors have SAO off or when both neighbors have SAO on and the SAO parameters are the same.

If merge left is not selected and the left neighbor conditions are the same as the above neighbor conditions, at block 830, an encoder may set the merge above flag to off and the merge above flag does not need to be transmitted to the decoder as the decoder can also determine this from previously decoded information. Still at block 830, if the encoder determines that the merge left flag is off, then at block 835, an encoder can set the on/off flag for the current LCU to on and then transmit SAO parameters for the current LCU. In this case the encoder does not need to send the on/off flag for the current LCU as the decoder can determine this from previously decoded information. The decoder may set the on/off flag for the current LCU to on and then parse the SAO parameters for the current LCU. In this example, the merge above flag and the on/off flag for the current LCU do not need to be transmitted from the encoder to the decoder.

If the merge left flag is not off at block 830, an encoder may determine if the on/off flag is on or off for the current LCU. If the on/off flag is on (block 840), an encoder may transmit SAO parameters (block 845). If the on/off flag is off, then SAO is determined to be off for the current LCU.

Referring back to block 820, if the left neighbor conditions are not the same as the above neighbor conditions, at block 850, an encoder may determine whether to merge above. If merge above is selected, then the SAO parameters from the above neighbor are copied.

If merge up is not selected, at block 860, an encoder may determine if the merge above or merge left flags are off. If at least one of the merge up or merge left flags is off, an encoder may set the on/off flag for the current LCU to on (block 865) and the encoder may transmit SAO parameters. In this case the encoder does not need to transmit the on/off flag for the current LCU as it can determine this from previously decoded information.

If both of the merge left and merge above flags are on, at block 870, an encoder may determine if the on/off flag for the current LCU is on. If the on/off flag is on, then SAO parameters are transmitted at block 875. If the on/off flag is off, then SAO is determined to be off for the current LCU.

A few of examples are provided herein that illustrate the logic of the condition tree of FIG. 8. For example, if merge left is false at block 810 (not using merge left) and if the left neighbor and above neighbor have the same SAO parameters (block 820), then the merge up flag does not need to be parsed or signaled, as it can be inferred and set to be false (block 830). The encoder does not need to send the merge up flag and the decoder can set the merge up flag to be false.

In another example, if merge left is false at block 810 and if both the left neighbor and above neighbor are SAO off at block 820, then merge above does not need to be signaled (block 830). Note that in this case, SAO on/off also does not need to be signaled for the current LCU at block 835, as the SAO type is on and is either Edge or Band. More generally, if either the left or above neighbor is SAO off, and if both merge left and merge above are false, then the SAO type of Skip (SAO off) does not need to be signaled as the current LCU has SAO on.

More efficient signaling can be achieved by conditionally skipping some of the flags, as described above. This disclosed method can be applied on an LCU or other unit and can also be applied on a color component basis, or jointly over the color components. Although FIG. 8 illustrates when the left neighbor is checked before the above neighbor, other neighbors and/or other neighbor orders may alternatively be used.

One example of signaling and parsing the SAO parameters using the disclosed method is shown below. This can be applied at the decoder. As mentioned previously, merge can apply to all color components jointly or to individual components in the example below. In the case that the merge flag applies to all color components jointly, then when neighboring LCUs are checked for equality of SAO parameters or on/off, this is checked for all color components, respectively. In the case that the merge flag applies to a single color component, then the neighboring LCUs are checked for equality of SAO parameters or on/off for the given color component. Note here that a separate flag (e.g., bit or bin) may be used to indicate SAO on/off (SAO_on flag), as this illustrates the potential savings when this flag is skipped. In the example, when the SAO_on flag or merge_up flag is skipped (shown in bold in the example), the flag is not transmitted to the decoder and so the decoder does not need to parse the flag. Bits are saved by not transmitting the flag and the decoder can infer the flag value from previously decoded information.

EXAMPLE

```
parse merge_left (if available)
if (merge_left = false, or left is not available)
{
    if (left neighbor SAO params = above neighbor SAO params)
    [skip merge_up flag]
    {
        if (left neighbor = SAO off) [skip SAO_on_flag]
            parse SAO Edge or Band type and offset values
        else {
            parse SAO_on_flag
```

-continued

```
            if (SAO_on_flag = true)
                parse SAO Edge or Band type and offset values
        }
    else {
        parse merge_above (if available)
        if (merge_above = false, or above is not available)
        {
            if (left neighbor = SAO off, or above nbr = SAO off)
            [skip SAO_on flag]
                parse SAO Edge or Band type and offset values
            else {
                parse SAO_on_flag
                if (SAO_on_flag = true)
                    parse SAO Edge or Band type and offset values
            }
        }
        else {
            current_unit = above SAO params (current uses above
            SAO params)
        }
    }
} else {
    current_unit = left neighbor SAO parameters (current uses left
    SAO parameters)
}
```

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method for determining sample adaptive offset parameters for blocks of a frame of a video sequence, the method comprising:
    determining whether to infer sample adaptive offset parameters for a first color component of a current block of the frame based on sample adaptive offset parameters of a left neighboring block of the current block;
    responsive to determining to infer the sample adaptive offset parameters for the first color component based on the sample adaptive offset parameters of the left neighboring block, using sample adaptive offset parameters of a corresponding color component of the left neighboring block as the sample adaptive offset parameters for the first color component;
    responsive to determining not to infer the sample adaptive offset parameters for the first color component based on the sample adaptive offset parameters of the left neighboring block, determining whether to infer the sample adaptive offset parameters for the first color component based on sample adaptive offset parameters of an above neighboring block of the current block;
    responsive to determining to infer the sample adaptive offset parameters for the first color component based on the sample adaptive offset parameters of the above neighboring block, using sample adaptive offset parameters of a corresponding color component of the above neighboring block as the sample adaptive offset parameters for the first color component; and responsive to determining not to infer the sample adaptive offset parameters for the first color component based on the sample adaptive offset parameters of the above neighboring block, explicitly signaling the sample adaptive offset parameters for the first color component of the current block.

2. The method of claim 1, the method further comprising: applying sample adaptive offset filtering to the frame according to the sample adaptive offset parameters for the first color component.

3. The method of claim 1, the method further comprising: using the sample adaptive offset parameters for the first color component as sample adaptive offset parameters for a second color component of the current block.

4. The method of claim 1, wherein determining whether to infer the sample adaptive offset parameters for the first color component based on the sample adaptive offset parameters of the left neighboring block comprises:

determining whether the left neighboring block is available.

5. The method of claim 1, wherein determining whether to infer the sample adaptive offset parameters for the first color component based on the sample adaptive offset parameters of the above neighboring block comprises:

determining whether the above neighboring block is available responsive to determining that the left neighboring block is not available.

6. The method of claim 1, wherein the sample adaptive offset parameters for the first color component comprise at least one of an offset value or an offset type for a luminance component or a chrominance component.

7. The method of claim 1, wherein, during an encoding process, data indicative of the sample adaptive offset parameters for the first color component are encoded within a bitstream representative of the video sequence.

8. The method of claim 1, wherein, during a decoding process, data indicative of the sample adaptive offset parameters for the first color component is received from an encoded bitstream representative of the video sequence.

9. An apparatus for determining sample adaptive offset parameters for blocks of a frame of a video sequence, the apparatus comprising:

a processor configured to execute instructions stored in a non-transitory storage medium to:

determine whether to infer sample adaptive offset parameters for a first color component of a current block of the frame based on sample adaptive offset parameters of a left neighboring block of the current block;

responsive to a determination to infer the sample adaptive offset parameters for the first color component based on the sample adaptive offset parameters of the left neighboring block, use sample adaptive offset parameters of a corresponding color component of the left neighboring block as the sample adaptive offset parameters for the first color component;

responsive to a determination not to infer the sample adaptive offset parameters for the first color component based on the sample adaptive offset parameters of the left neighboring block, determine whether to infer the sample adaptive offset parameters for the first color component based on sample adaptive offset parameters of an above neighboring block of the current block;

responsive to a determination to infer the sample adaptive offset parameters for the first color component based on the sample adaptive offset parameters of the above neighboring block, use sample adaptive offset parameters of a corresponding color component of the above neighboring block as the sample adaptive offset parameters for the first color component; and responsive to a determination not to infer the sample adaptive offset parameters for the first color component based on the sample adaptive offset parameters of the above neighboring block, explicitly signal the sample adaptive offset parameters for the first color component of the current block.

10. The apparatus of claim 9, wherein the processor is configured to execute instructions stored in a non-transitory storage medium to:

apply sample adaptive offset filtering to the frame according to the sample adaptive offset parameters for the first color component.

11. The apparatus of claim 9, wherein the processor is configured to execute instructions stored in a non-transitory storage medium to:

use the sample adaptive offset parameters for the first color component as sample adaptive offset parameters for a second color component of the current block.

12. The apparatus of claim 9, wherein the processor is configured to execute instructions stored in a non-transitory storage medium to determine whether to infer the sample adaptive offset parameters for the first color component based on the sample adaptive offset parameters of the left neighboring block by:

determining whether the left neighboring block is available.

13. The apparatus of claim 9, wherein the processor is configured to execute instructions stored in a non-transitory storage medium to determine whether to infer the sample adaptive offset parameters for the first color component based on the sample adaptive offset parameters of the above neighboring block by:

determining whether the above neighboring block is available responsive to determining that the left neighboring block is not available.

14. The apparatus of claim 9, wherein the sample adaptive offset parameters for the first color component comprise at least one of an offset value or an offset type for a luminance component or a chrominance component.

15. The apparatus of claim 9, wherein, during an encoding process, data indicative of the sample adaptive offset parameters for the first color component are encoded within a bitstream representative of the video sequence.

16. The apparatus of claim 9, wherein, during a decoding process, data indicative of the sample adaptive offset parameters for the first color component is received from an encoded bitstream representative of the video sequence.

17. A method for sample adaptive offset filtering, the method comprising:

applying sample adaptive offset filtering to a frame including a current block according to an edge offset or a band offset for a first color component of the current block responsive to determining that a neighbor block of the current block usable for merge mode is available, wherein parameters for the edge offset or the band offset are inferred from the neighbor block.

18. The method of claim 17, the method further comprising:

responsive to determining that the neighbor block is a left neighboring block of the current block, inferring the parameters based on sample adaptive offset parameters of the left neighboring block; and responsive to determining that the neighbor block is an above neighboring block of the current block and that no left neighboring block of the current block is available, inferring the parameters based on sample adaptive offset parameters of the above neighboring block.

19. The method of claim 17, the method further comprising:

responsive to determining that no left neighboring block of the current block or above neighboring block of the current block is available, applying the sample adaptive offset filtering to the frame according to an explicitly signaled edge offset or band offset for the color component of the current block.

20. The method of claim 17, the method further comprising:

using the parameters for the first color component as parameters for a second color component of the current block.

\* \* \* \* \*